(12) United States Patent
Stock et al.

(10) Patent No.: US 8,746,312 B2
(45) Date of Patent: Jun. 10, 2014

(54) BEARING ARRANGEMENT AND LABELING MACHINE WITH SUCH A BEARING ARRANGEMENT

(75) Inventors: Klaus-Friedrich Stock, Dortmund (DE); Heinz Thielmann, Dortmund (DE); Paul-Gerhard Kahlisch, Fröndenberg (DE)

(73) Assignee: KHS GmbH, Dortmund (DE)

( * ) Notice: Subject to any disclaimer, the term of this patent is extended or adjusted under 35 U.S.C. 154(b) by 216 days.

(21) Appl. No.: 12/996,729

(22) PCT Filed: Aug. 7, 2009

(86) PCT No.: PCT/EP2009/005728
§ 371 (c)(1),
(2), (4) Date: Dec. 7, 2010

(87) PCT Pub. No.: WO2010/020357
PCT Pub. Date: Feb. 25, 2010

(65) Prior Publication Data
US 2011/0079360 A1    Apr. 7, 2011

(30) Foreign Application Priority Data
Aug. 18, 2008   (DE) .......................... 10 2008 038 135

(51) Int. Cl.
*B65C 3/12*   (2006.01)
*B65C 3/16*   (2006.01)

(52) U.S. Cl.
USPC ............ 156/446; 156/540; 384/416; 384/418

(58) Field of Classification Search
USPC ............ 156/446, 540, 541, DIG. 9, DIG. 10, 156/DIG. 11; 384/416, 418
See application file for complete search history.

(56) References Cited

U.S. PATENT DOCUMENTS

| | | | |
|---|---|---|---|
| 3,201,299 | A  | 8/1965  | Fairest |
| 4,362,594 | A  | 12/1982 | Nagano et al. |
| 2004/0233576 | A1 | 11/2004 | Khan |
| 2008/0247687 | A1 | 10/2008 | Stecher |

FOREIGN PATENT DOCUMENTS

| | | |
|---|---|---|
| DE | 115508 | 2/1900 |
| DE | 30 11 220 | 10/1981 |
| DE | 3102950 | 1/1982 |
| DE | 37 36 292 | 5/1989 |
| DE | 3933804 | 4/1991 |
| DE | 200 19 839 | 2/2001 |
| DE | 102005009552 | 9/2006 |
| DE | 102006006844 | 8/2007 |
| DE | 20221787 | 9/2007 |
| EP | 0422426 | 4/1991 |
| WO | 02/42032 | 5/2002 |

OTHER PUBLICATIONS

Translation of DE 20019839, published Feb. 8, 2001.*
Translation of DE 3011220, published Oct. 1, 1981.*

(Continued)

*Primary Examiner* — George Koch
(74) *Attorney, Agent, or Firm* — Occhiuti & Rohlicek LLP

(57) ABSTRACT

The invention relates to a bearing arrangement between a carrier (15) for pressing and/or brushing elements (14) and a rotor (4) of a labeling machine (1), said rotor driven about a vertical machine axis (MA), with at least one first bearing element (19) provided on the rotor and a second bearing element (28) provided on the carrier (15), wherein the bearing elements abut one another across bearing surfaces forming a sliding bearing.

23 Claims, 4 Drawing Sheets

(56) References Cited

OTHER PUBLICATIONS

Translation of DE 3736292, published May 30, 2002.*

"Nirosta 4462 (UNS S 31803/UNS S 32205) Ferritic-austenitic duplex steel with high strength and corrosion resistance" *ThyssenKrupp Nirosta* (12 pages) Feb. 2002.

* cited by examiner

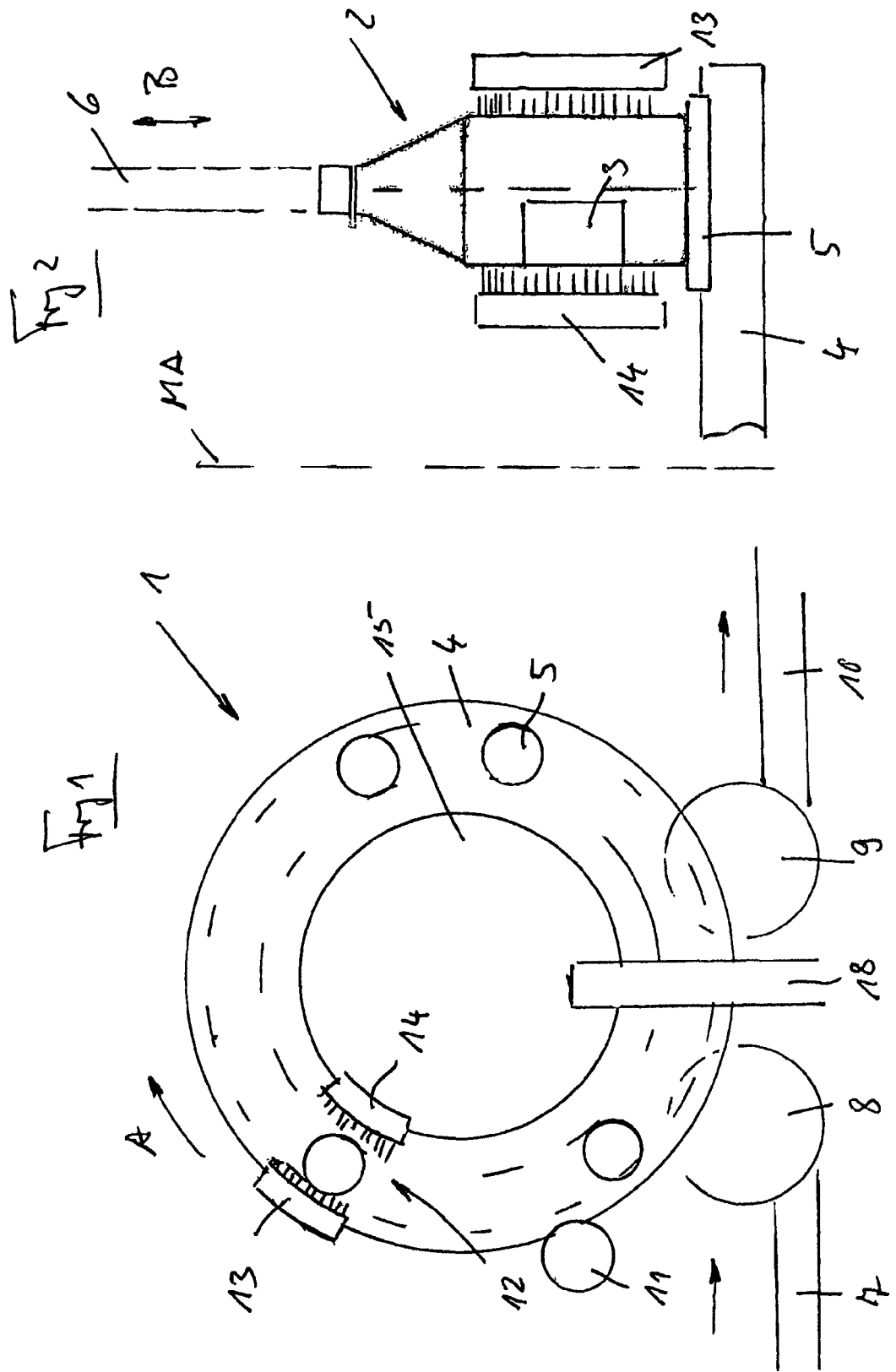

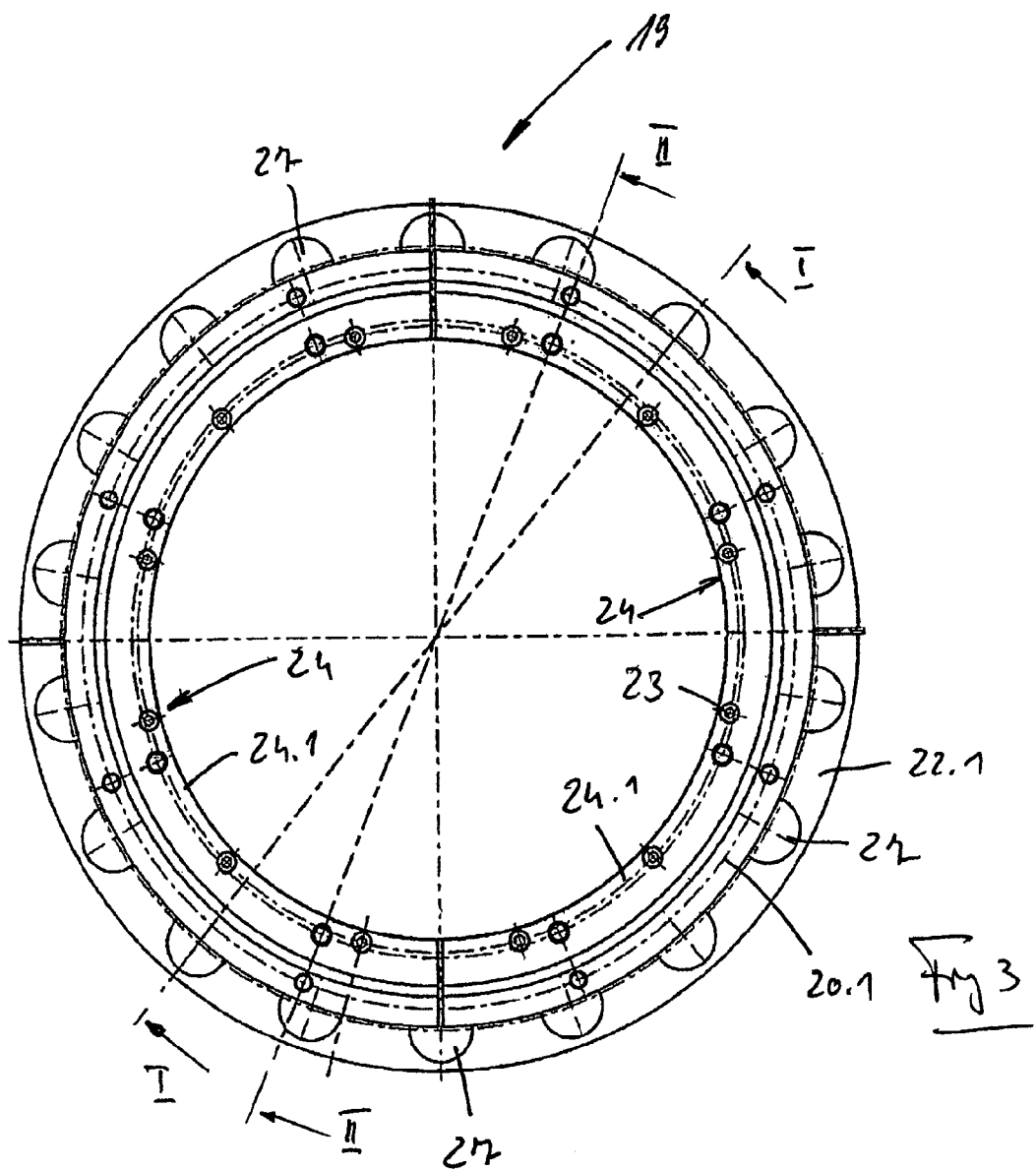

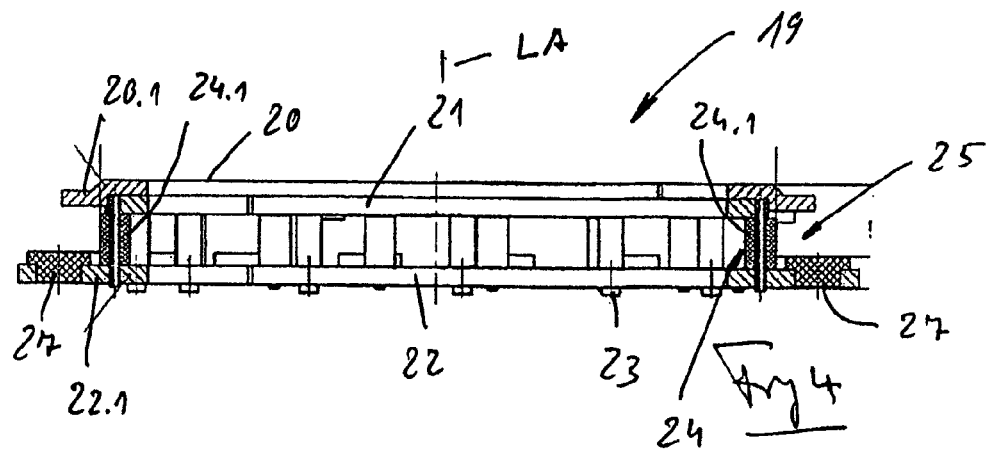
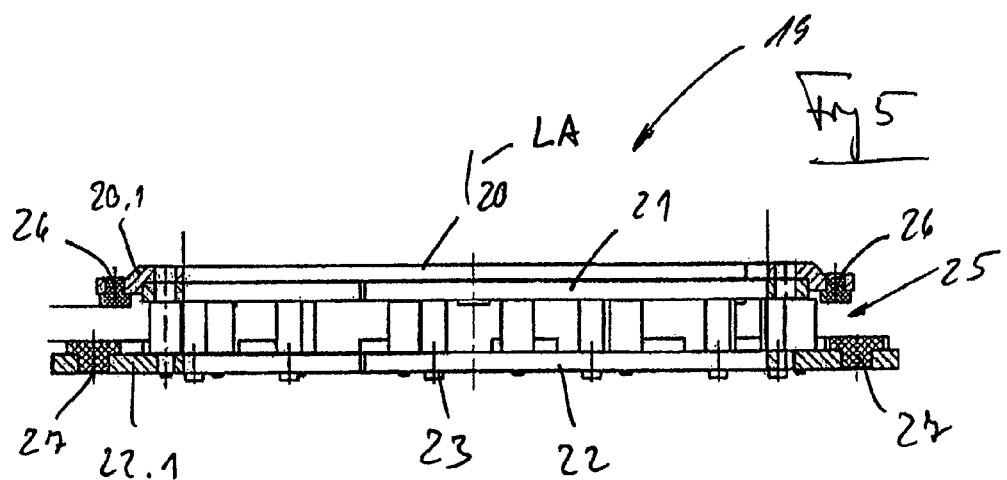

BEARING ARRANGEMENT AND LABELING MACHINE WITH SUCH A BEARING ARRANGEMENT

CROSS-REFERENCE TO RELATED APPLICATIONS

This application is the National Stage of International Application No. PCT/EP2009/005728, filed on Aug. 7, 2009, which claims the benefit of German Application Serial No. 10 2008 038 135.7, filed Aug. 18, 2008. The contents of both of the foregoing applications are hereby incorporated by reference in their entirety.

The invention relates to a bearing arrangement between a carrier for pressing-on and/or brushing elements and a rotor of a labelling machine of the rotating type, said rotor being driveable in a rotating manner about a vertical machine axis, according to the preamble of claim 1 and to a labelling machine with such a bearing arrangement according to the preamble of claim 15.

Numerous designs of labelling machines for labelling bottles or other containers are known. Labelling machines that are designed in particular as rotary machines are also known, in each case having a rotor that is driveable in a rotating manner about a vertical machine axis, at the periphery of which rotor, distributed about the machine axis, a plurality of treatment stations are formed each for one container, at which treatment stations the containers are moved with the rotor on a transport section past at least one labelling unit for the transfer of the labels to the containers and subsequently also past pressing-on and brushing elements for the complete pressing-on and/or for the brushing-on and smoothing-over of the labels. The pressing-on and brushing elements, in this case, are located, for example, with reference to the machine axis partially on the radially outside side, but partially also on the radially inside side of the transport path of the containers. As a result of the design, a carrier is necessary for the inside pressing-on and/or brushing elements, i.e. provided on the radially inside side of the transport path, said support not being entrained with the rotor, but being supported on said rotor or on a shaft or column of the rotor by means of a bearing arrangement.

In the case of known labelling machines, this bearing arrangement or supporting arrangement for the carrier for the inside pressing-on and/or brushing elements is effected by means of ball bearings or sliding bearings made of metal. Both systems have considerable disadvantages. On account of the spatial conditions, the ball bearings used for this application have to have a relatively large diameter with otherwise small dimensions. This means that ball bearings of this type are exceptionally expensive and have a short service life. Over and above this, possible replacement in the event of a fault requires extensive disassembly work that, among other things, leads to considerable production downtime. The metallic sliding bearings used up to now have comparative disadvantages just as the ball bearings and they also incur increased expenditure for continuously maintaining adequate lubrication. In addition, the bearing arrangements are realized in an open style on account of the construction such that there is an increased risk that a certain amount of lubricant will continually escape from the bearing arrangement and this will contaminate not only the labelling machine and the labels but also the containers to be labelled or the containers that have already been labelled, which is increasingly unacceptable.

It is the object of the invention to provide a bearing arrangement that avoids these disadvantages. This object is achieved through a bearing arrangement corresponding to claim 1. A labelling machine with a bearing arrangement of this type is the object of claim 15.

It has been shown in a surprising manner that it is possible to realize a bearing arrangement for supporting a carrier for pressing-on and/or brushing elements in the form of a sliding bearing without lubrication that has a sufficient service life if a particularly advantageous material pairing between plastics material and metal is selected for the interacting bearing surfaces.

In the case of a preferred embodiment of the invention, the plastics material of said material pairing is a plastics material from the group of the polyetherketones, for example PEEK. The metal of the material pairing plastics material/metal is preferably a corrosion-resistant steel, in particular steel that is resistant to pitting corrosion and/or stress corrosion, for example a duplex steel that has austenitic and ferritic crystal grains in the material structure, for example with an austenite/ferrite ratio of 50:50 and with a strength value that is approximately twice the corresponding characteristic value of other rust-proof steels.

Further developments, advantages and application possibilities of the invention are produced from both the following description of exemplary embodiments and from the Figures. In this case, all features described and/or graphically represented are, in principle, on their own or in arbitrary combination, objects of the invention irrespective of their summary in the claims or their dependency. The content of the claims is also made a component of the description.

The invention is described below by way of the Figures of an exemplary embodiment, in which, in detail:

FIG. 1 shows a very simplified schematic representation and top view of a labelling machine according to the invention;

FIG. 2 shows a schematic representation of a treatment station of the labelling machine with a bottle arranged at that location;

FIG. 3 shows a bearing element of a bearing arrangement for a holder for pressing-on and/or brushing elements to be used with the labelling machine in FIG. 1;

FIGS. 4 and 5 show sections corresponding to the line Nor II-II in FIG. 3;

Figure 6:
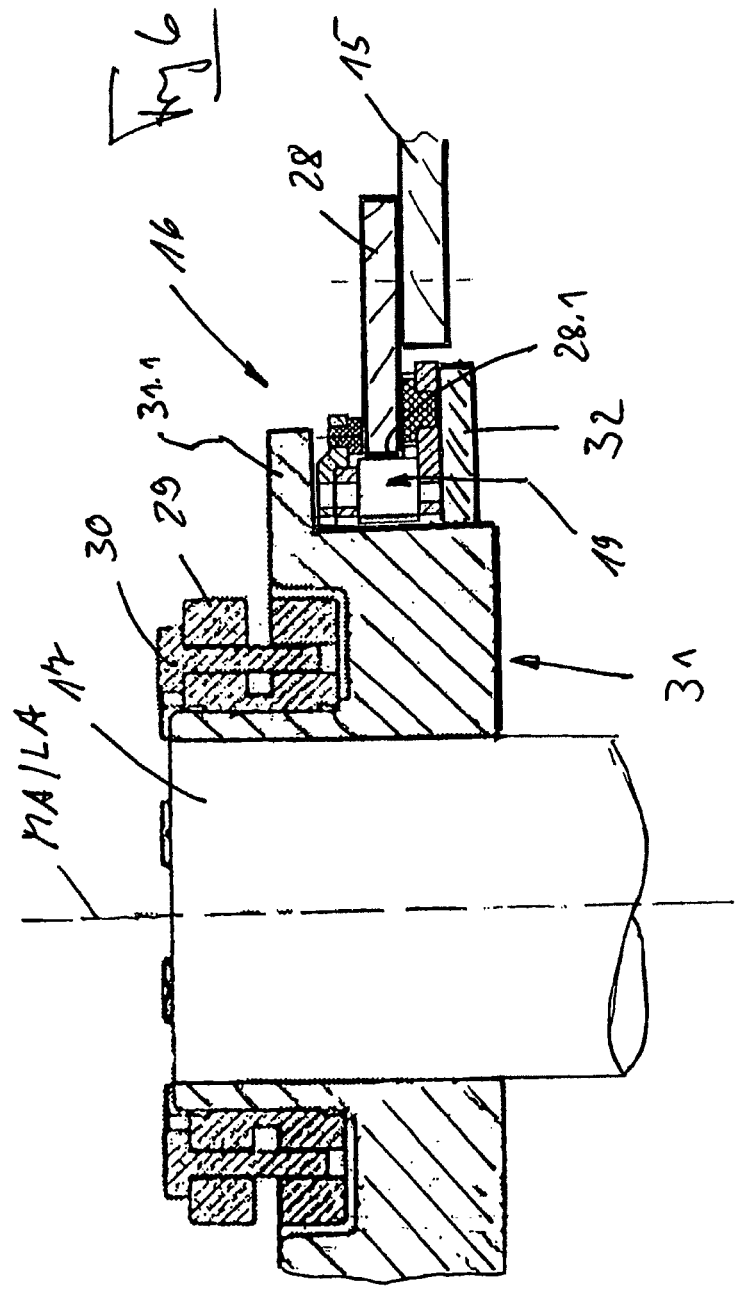
FIG. 6 shows a part representation and sectional representation of the bearing arrangement that is secured to a shaft that rotates with the rotor of the labelling machine, together with the holder for pressing-on and/or brushing elements.

The reference 1 in the Figures is given to a labelling machine of the rotating type for labelling bottles 2 or other containers with labels 3. Among other things, the labelling machine 1 includes, in a known manner, a rotor 4 that is driveable in a rotating manner about a vertical machine axis MA (arrow A), on which rotor is provided a plurality of treatment stations, each one consisting at least of a bottle plate 5 that forms a standing surface for the respective bottle 2 and a plunger that is located above the bottle plate 5 and is moveable up and down in a controlled manner, for example by means of control cams (double arrow B in FIG. 2).

The bottles 2 to be labelled are supplied to the labelling machine 1 by means of an external conveyor 7 and a container or bottle inlet 8. The labelling of the bottles 2 is carried out in the angular region of the rotational movement of the rotor 4 between the bottle inlet 8 and a bottle outlet 9, at which the labelled bottles 2 are removed again from the treatment positions and supplied by means of an external conveyor 10 to another use. To this end the bottles 2, which once they have been transferred to the respective treatment position are held at that location clamped between the bottle plate 5 and the lowered plunger 6, are moved by way of the rotor 4 initially to at least one labelling unit 11 for the transfer of the respective label 3 and then, where applicable with the bottles 2 being rotated or pivoted about their vertical bottle axis, by way of the rotational movement of the rotor 4 through at least one pressing-on and/or brushing operation 12. This is formed by pressing-on and/or brushing elements, which are not entrained by the rotor 4 and are located on both sides of the circular path of movement or conveying section of the bottles 2, these being outside pressing-on and brushing elements 13, which are located on the radially outside side of the pressing-on and brushing operation 12 with reference to the machine axis MA, and inside pressing-on and brushing elements 14 which are located on the radially inside side of the pressing-on and brushing operation 12 with reference to the machine axis MA.

The outside pressing-on and brushing elements 13 are secured in a suitable manner on the frame of the labelling machine preferably so as to be adjustable. A carrier 15 is provided for the securing of the inside pressing-on and brushing elements 14, said carrier also being, for example, adjustable and being supported and held by means of a bearing arrangement 16 (FIG. 6) on a column or shaft 17 that is located on the identical axis as the machine axis MA and rotates with the rotor 4. In addition, the carrier 15 is connected to the frame of the labelling machine 1 via a torque support 18 such that the carrier 15 does not move with the rotor 4. The torque support 18, in this case, is provided in the angular region of the rotational movement of the rotor 4 between the container outlet 9 and the container inlet 8, i.e. where there are no bottles 2 situated at the treatment positions of the rotor 4 and in addition the plunger 6 is raised into its upper position.

As shown in FIGS. 3-6 in detail, the bearing arrangement 16 essentially consists of a ring-shaped first bearing element 19, which in the embodiment represented is formed by a total of three rings 20, 21 and 22, which, in each case, are realized on their inside and outside ring surface in a circular shape and are interconnected on the identical axis and are also connected to the bearing element 19 on the identical axis as the axis LA of said bearing arrangement 19 by means of bolts or other securing or clamping elements 23.

The upper ring 20 in FIGS. 4-6, directly resting on the ring 21, has an outside diameter that is greater than the outside diameter of the ring 21 such that the ring 20 projects beyond the ring 21 by way of a ring-shaped circumferential region 20.1. The lower ring 22 in FIGS. 4-6 has an outside diameter that is greater than the outside diameter of the ring 20 such that the ring 22 also projects radially beyond the ring 20 by way of a ring-shaped circumferential region 22.1.

The lower ring 22 is spaced apart from the two upper rings 20 and 21 by at least two ring segments or bearing pieces 24.1 which are produced from plastics material and together form a circular bearing element 24 that surrounds the axis LA in a concentric manner. A bearing gap 25 is formed by the bearing pieces 24.1 between the edge regions or circumferential regions 20.1 and 22.1, said gap, with reference to the axis LA, being open radially to the outside and surrounding the axis LA in a concentric manner. The circumferential regions 20.1 and 22.1, at their surfaces facing each other and defining the bearing gap 25 at the top and at the bottom, are provided in said bearing gap in a sectional manner with bearing pieces 26 and 27, which form bearing surfaces and are also produced as moulded parts from a suitable plastics material, in the embodiment represented in each case in a disc-shaped manner with integrally moulded securing journals that engage in bores in the circumferential regions 20.1 and 22.1.

As shown in FIG. 6, the carrier 15, realized at least in the region of the machine axis LA in a disc-shaped manner, is provided at the bearing arrangement 15 with a bearing opening 28.1, which is formed by the opening of a ring-shaped bearing element 28 (bearing ring) made of metal. The bearing element 28 is accommodated in a partial manner in the bearing gap 25 and is supported radially relative to the machine axis MA on the outside surface of the bearing pieces 24.1 and axially relative to the machine axis MA on the upper and lower bearing pieces 26 and 27.

The bearing element 19 is secured to the shaft 17 in the mounted state by means of clamping in such a manner that the axis LA is on the identical axis as the axis MA. For this securing, in the embodiment represented a disc-like bearing carrier 31 is secured on the shaft 17 by means of a shrink disc 29 and clamping screw 30, onto which the bearing element 19 is placed so as to surround said bearing carrier 31 by way of its inner ring opening and on which the bearing element 19 is held between a flange 31.1 of the bearing carrier 31 and a clamping ring 32 by means of clamping.

The material pairing between the plastics material, from which the bearing pieces 24.1, 26 and 27 are produced at least in the region of their bearing surfaces, and the metal, from which the bearing element 28 is produced at least in the region of its bearing surfaces, is selected such that as low a friction coefficient as possible is produced between the bearing elements 19 and 28, without lubrication and at the same time with a sufficiently long service life.

Suitable as material for the bearing pieces 24.1, 26 and 27, for example, are high-resistance, temperature-resistant plastics materials, in particular thermoplastic plastics materials, such as, for example, polyetherketones, e.g. from the group PEEK or PEEEK or PEEKEK or PEKK, or also copolymers of different plastics materials.

Suitable as material for the bearing element 28 or the bearing surfaces at that location are steels that have a high degree of corrosion-resistance in particular against pitting corrosion and stress fracture corrosion, e.g. duplex steels, preferably with an austenite/ferrite ratio of approximately 50:50. A suitable steel is, for example, a stainless steel with the material number 1.4462 (X2CrNiMoN22-5-3).

A substantial advantage of the described bearing arrangement 16 for the bearing and/or supporting of the carrier 15 at the rotor 4 or at the shaft 7 is that said bearing arrangement is achieved with a long service life without lubricant. Another substantial advantage is also that the bearing arrangement 16, and in this case in particular the ring-shaped bearing element 19, is made up of a plurality of individual parts and it is possible to remove the bearing element 19 easily and without any difficulty from the shaft 17 which means that individual components of the bearing arrangement 16 and of the bearing element 19 can be replaced without any difficulty in the event of wear. This applies not only to the bearing pieces 24.1, 26 and 27, but also to the rings 20-22. The replacement of worn components of the bearing arrangement 16 is possible rapidly and simply without any protracted assembly work. The usage of high-priced components is reduced in a considerable manner by the replaceability of the components of the bearing arrangement 16.

The invention has been explained above by way of an exemplary embodiment. It is obvious that numerous changes and conversions are possible without in any way departing from the inventive concept underlying the invention.

It goes without saying, in particular, that the proposed bearing arrangement according to the invention, and, as a result, also the labelling machines equipped with such a bearing arrangement, are provided for the labelling of all types of containers. The containers referred to can, for example, also be cans, screw-cap glasses, plastics material containers, vessels and KEGs, etc.

| List of references | |
|---|---|
| 1 | Labelling machine |
| 2 | Bottle |
| 3 | Label |
| 4 | Rotor |
| 5 | Bottle plate |
| 6 | Plunger |
| 7 | External conveyor |
| 8 | Container inlet |
| 9 | Container outlet |
| 10 | External conveyor |
| 11 | Labelling unit |
| 12 | Pressing-on and brushing operation |
| 13, 14 | Pressing-on or brushing element |
| 15 | Carrier for the pressing-on or brushing elements 14 |
| 16 | Bearing arrangement for carrier 15 |
| 17 | Shaft |
| 18 | Torque take-up or support |
| 19 | Ring-shaped bearing element |
| 20, 21, 22 | Ring |
| 20.1, 22.1 | Outside ring or circumferential region |
| 23 | Connecting or clamping element |
| 24 | Ring-shaped bearing element |
| 24.1 | Ring segment or bearing piece |
| 25 | Bearing gap |
| 26, 27 | Bearing piece |
| 28 | Bearing element or bearing ring |
| 28.1 | Bearing opening in the bearing element 28 |
| 29 | Shrink disc |
| 30 | Clamping element |
| 31 | Bearing carrier |
| 31.1 | Flange |
| 32 | Clamping ring |
| A | Rotational movement of the rotor 4 |
| B | Stroke movement of the plunger 6 |
| MA | Machine axis |
| LA | Axis of the bearing element 19 |

The invention claimed is:

1. An apparatus comprising a labeling machine, said labeling machine comprising a rotor, a first brush, a second brush, a carrier, and a bearing arrangement, wherein said first brush is disposed on a radial line at a first radius from an axis of said rotor, wherein said second brush is disposed along said radial line and opposite said first brush at a second radius from said axis, said first brush and said second brush thereby defining a channel therebetween for passage of bottles between said first brush and said second brush, said channel between said first brush and said second brush having a width sufficient to accommodate a bottle while enabling said first brush to contact a first portion of a surface of said container and said second brush to contact a second portion of said surface of said container and second brushes to contact opposing surfaces of said container, wherein said bottles are passed between said first brush and said second brush by a rotor that carries said bottles, wherein, in use, said rotor is in motion relative to said first and second brushes, wherein said carrier supports said first brush element, wherein said carrier remains stationary while said rotor rotates, wherein said bearing arrangement is provided between said rotor and said carrier to assist in preventing said carrier from being entrained by said rotor, wherein said bearing arrangement is a sliding bearing, wherein said sliding bearing comprises a first bearing element on said rotor, wherein said first bearing element comprises a first bearing surface, wherein said sliding bearing comprises a second bearing element on said carrier, wherein said second bearing element comprises a second bearing surface, wherein said first bearing surface directly abuts said second bearing surface, wherein one of said first bearing surface and said second bearing surface is made of plastic, and wherein an other of said first bearing surface and said second bearing surface is made of corrosion-resistant metal.

2. The apparatus of claim 1, further comprising a torque support extending along a radial axis of said rotor, said torque support being connected to said carrier for assisting in prevention of said carrier from being entrained by said rotor.

3. The apparatus of claim 2, wherein said torque support extends along a radial axis of said rotor.

4. The apparatus of claim 1, wherein said corrosion-resistant metal comprises duplex steel, and wherein said duplex steel comprises austenitic crystal grains and ferritic crystal grains.

5. The apparatus of claim 1, wherein said corrosion-resistant metal comprises stainless steel.

6. The apparatus of claim 1, wherein said plastic comprises a high-resistance, temperature-resistant thermoplastic.

7. The apparatus of claim 6, wherein said plastic comprises a polyetherketone.

8. The apparatus of claim 7, wherein said polyetherketone comprises PEEK.

9. The apparatus of claim 7, wherein said polyetherketone comprises PEEEK.

10. The apparatus of claim 7, wherein said polyetherketone comprises PEEKEK.

11. The apparatus of claim 7, wherein said polyetherketone comprises PEKK.

12. The apparatus of claim 1, wherein a bearing element that comprises a bearing surface made of plastic is structurally configured to be a replaceable bearing element, thereby permitting said bearing element to be replaced after having used said apparatus.

13. The apparatus of claim 12, wherein said bearing surface made of plastic is structurally configured to be a replaceable bearing element by being made of individual parts that can be removed and replaced when worn.

14. The apparatus of claim 13, wherein said individual parts comprise bearing pieces that face each other across a bearing gap.

15. The apparatus of claim 13, wherein said individual parts comprise a first ring centered about said rotor axis, a second ring centered about said rotor axis, and a third ring centered about said rotor axis, said first and second rings being spaced apart across a gap, and said third ring overlying said first ring and having an outer diameter greater than said first and second rings.

16. The apparatus of claim 1, wherein said bearing arrangement comprises an axial bearing and a radial bearing.

17. The apparatus of claim 1, wherein said first bearing element defines a bearing gap, wherein said bearing gap is concentric with an axis of said bearing arrangement, and wherein at least a portion of said second bearing element is accommodated within said bearing gap.

18. The apparatus of claim 1, wherein said first bearing element comprises a ring-shaped bearing piece made of plastic, said ring-shaped bearing piece forming a bearing surface for radially supporting said second bearing element.

19. The apparatus of claim 1, wherein said first bearing element comprises a plurality of bearing pieces made of plastic, said bearing pieces forming a bearing surface for axially supporting said second bearing element.

20. The apparatus of claim 19, wherein said bearing pieces are structurally configured to be replaceable when worn.

21. The apparatus of claim 1, wherein said first bearing element comprises at least two rings that are both located on an axis and are axially spaced apart from each other along said axis, thereby forming therebetween a bearing gap for said second bearing element, and wherein said bearing gap is defined with reference to an axis of said bearing arrangement by plastic bearing pieces that are provided between said rings and/or at said rings.

22. The apparatus of claim 1, wherein said second bearing element forms a bearing surface made of metal, and wherein said second bearing element is one of provided on said carrier and formed by a portion of said carrier.

23. The apparatus of claim 1, wherein said second bearing element forms a bearing surface made of metal, and wherein said second bearing element comprises a bearing ring.

\* \* \* \* \*